United States Patent [19]
Jung

[11] Patent Number: 5,399,849
[45] Date of Patent: Mar. 21, 1995

[54] FOCUSING CONTROL APPARATUS FOR AN OPTICAL DISK SYSTEM EMPLOYING A GAIN ADJUSTED AND PHASE COMPENSATED ERROR SIGNAL

[75] Inventor: Soo-yul Jung, Kyungki-do, Rep. of Korea

[73] Assignee: Samsung Electronics Co., Ltd., Kyungki-Do, Rep. of Korea

[21] Appl. No.: 175,278

[22] Filed: Dec. 29, 1993

[30] Foreign Application Priority Data

Jul. 31, 1993 [KR] Rep. of Korea ............... 93-15007

[51] Int. Cl.$^6$ ............................................. G01J 1/20
[52] U.S. Cl. ..................... 250/201.5; 369/44.13; 369/44.36
[58] Field of Search .......... 250/201.5; 369/44.36, 369/44.35, 44.29, 54, 44.34, 44.32, 44.13

[56] References Cited

U.S. PATENT DOCUMENTS

| | | | |
|---|---|---|---|
| 4,475,182 | 10/1984 | Hosaka | 369/45 |
| 4,667,315 | 5/1987 | Fujii et al. | 369/44 |
| 4,669,074 | 5/1987 | Hsieh et al. | 369/45 |
| 4,985,882 | 1/1991 | Tanaka et al. | 369/44.32 |

FOREIGN PATENT DOCUMENTS

9122366  5/1986  Japan .

*Primary Examiner*—David C. Nelms
*Assistant Examiner*—Steven L. Nichols
*Attorney, Agent, or Firm*—Leydig, Voit & Mayer

[57] ABSTRACT

A focusing control apparatus for use in an optical disk system includes a focusing error detector for detecting the focusing error signal from the focusing information of a light beam irradiated onto and reflected by an optical disk, a system state gain controller for detecting the state of the system from an error signal detected from the focusing error detector, so as to automatically control the gain of the system according to the change in system gain, a phase compensator circuit for compensating phase of focuing error signal according to the focusing error signal whose gain is controlled by the system state gain control means, and an actuator driving circuit for driving the actuator according to the compensated signal, so as to maintain system stability.

10 Claims, 6 Drawing Sheets

FOCUSING CONTROL APPARATUS FOR AN OPTICAL DISK SYSTEM EMPLOYING A GAIN ADJUSTED AND PHASE COMPENSATED ERROR SIGNAL

BACKGROUND OF THE INVENTION

The present invention relates to a focusing control apparatus for an optical disk system, and more particularly, to a focusing control apparatus for changing the gain in a circuit according to a change in system gain, so as to maintain system stability.

To read the information from a compact disk or laser disk which is used for record/reproduction in an optical disk system, a tracking servo controls the tracing of the track formed on the surface of the disk. Also, to accurately focus a light beam on the track, a focus servo should be accomplished. Otherwise, it is difficult to read the recorded information correctly.

To read the recorded information, an optical pickup should be moved up and down in order to follow the minute vertical movement of the disk during rotation. If this vertical movement is accomplished, the data can be accurately reproduced. For this end, a focusing control is adopted.

In the optical disk apparatus, the surface of the recording medium is perpendicular to the beam's traveling direction. The optical-beam spot should always be focused on the surface of the recording medium during disk rotation. To meet this objective, it is necessary for the beam focusing to be accurately controlled in the vertical direction with respect to the disk's surface.

However, when a spindle motor is rotated by a motor control apparatus with the insertion of the disk in the driver of the optical disk system, the disk tends to vibrate vertically (parallel to the axial shaft) due to the skewing of the spindle motor or a warpage of the disk itself. At this time, the focusing control apparatus drives the movable objective lens along the axial direction, so that a laser beam passing through the objective lens keeps up with the planar vibration of the disk, to thereby maintain beam spot focusing on the surface of the disk.

Figure 1:
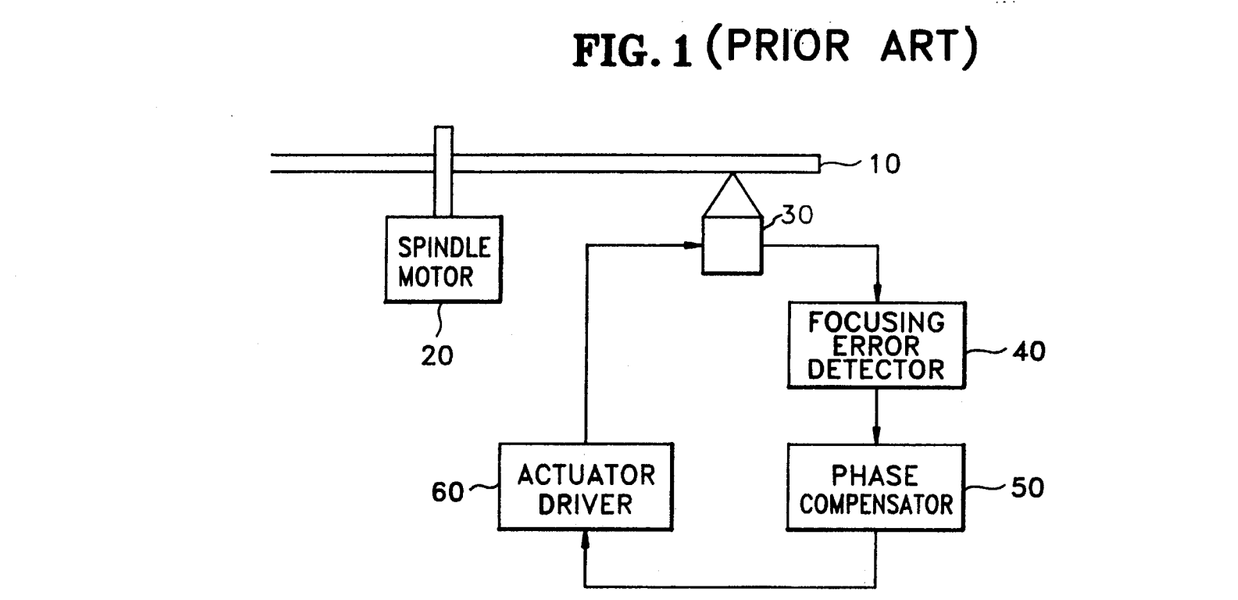
FIG. 1 is a schematic block diagram of the conventional focusing control apparatus of the optical disk system.
Figure 2:
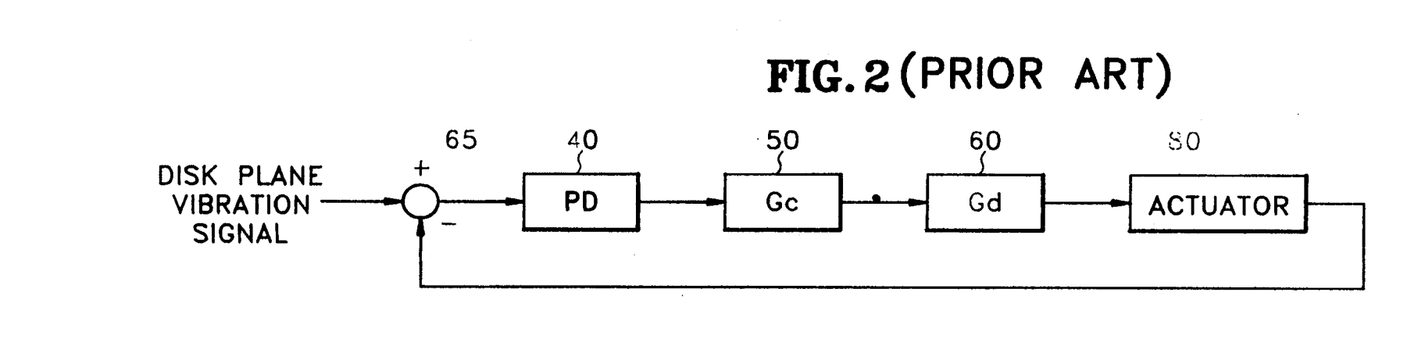
FIG. 2 is a block diagram showing the focusing control apparatus of the conventional optical disk system.

FIG. 1 shows a schematic block diagram of the focusing control apparatus which performs the above-described control in an optical disk system. Referring to FIGS. 1 and 2, reference numeral 10 indicates an optical disk for reproducing the recorded data, 20 is a spindle motor for rotating the disk under the control of a servo (not shown), 30 is an optical pickup for detecting the recorded data by irradiating a light beam onto the surface of the disk, 40 is a focusing error detector, 50 is a phase compensator, 60 is an actuator driver, 80 is an actuator, and 65 is a subtracter for subtracting an output singal of actuator 80 from an disk plane vibration signal.

In an optical disk system constructed as above, disk 10 is rotated at a constant rotation speed by spindle motor 20, and optical pickup 30 irradiates the light beam onto disk 10 and supplies focusing error detector 40 with the focusing information obtained from the reflected light beam. Thus, error information can be detected.

Using the above-detected error information, phase compensator 50 compensates the phase of the input signal and actuator driver 60 drives the actuator installed on optical pickup 30 according to the compensation value, so that the focusing control for the vertical movement of the objective lens can be performed.

The focusing control executed by the focusing control apparatus of FIG. 1 will be described in more detail with reference to the construction of the compensator circuit shown in FIG. 2.

Referring to FIG. 2, when the vibration of the scanned disk surface scanned by the objective lens occurs and, accordingly, focusing is less than optimum, the amount of error is detected by focusing error detector 40 where it is converted into an electrical signal.

The structure of focusing error detector 40 is generally known. A conventional light-beam detector which is included in focusing error detector 40 and comprised of a quadrant photodiode or one divided into two sections, generates a current signal corresponding to the intensity of the light beam reflected from the disk. Next, the current generated by each detector section is converted into a voltage by a current-to-voltage converter, with the resulting voltage being input to a subtracting circuit. The output of the subtracter is the error signal. The error signal can be detected by a variety of other methods, for example, a knife edge method, an astigmatism method, the Puco method or a critical angle method.

The error signal is input to phase compensator 50 which produces the correction signal minimizing the input error. The correction signal is then input to actuator driver 60 which drives an actuator according to the input driving signal, so that the focus of the beam spot can keep up with the plane vibration of the disk at all times.

Here, phase compensator 50 should be designed such that it increases the system gain large enough in transmission characteristic of the overall loop, so as to not only restrict the error amount within the focusing depth, but also secure the sufficiently large phase at the gain cross frequency.

Figure 3:
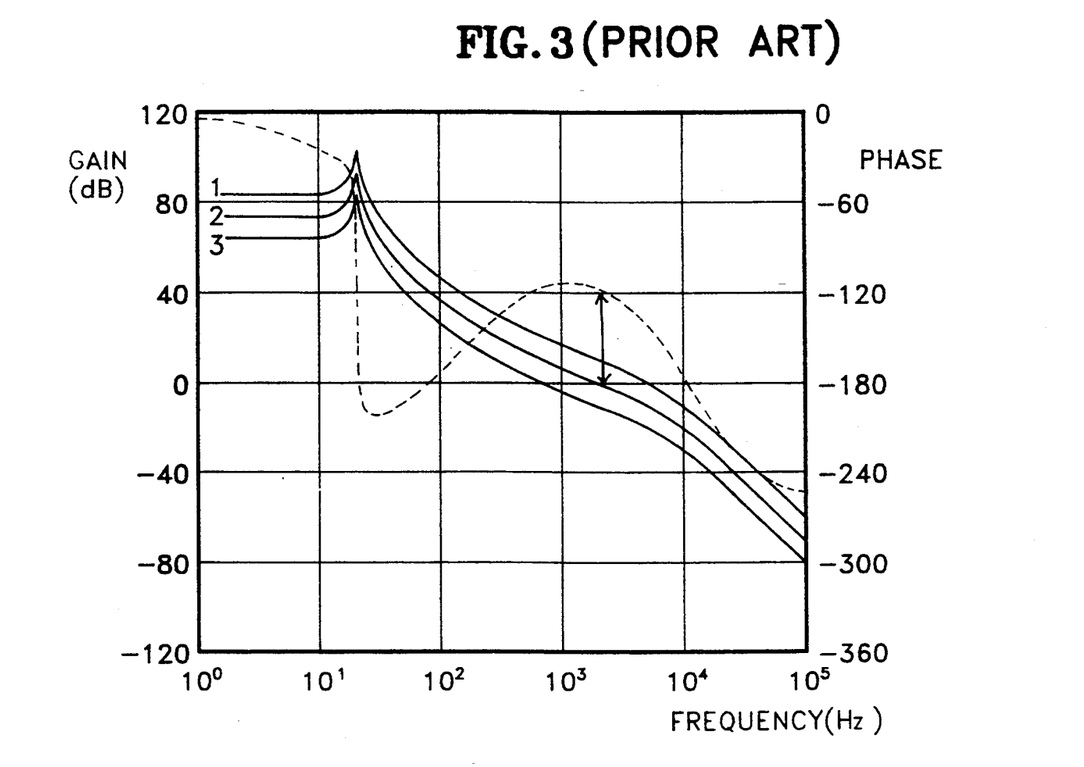
FIG. 3 is a gain and phase characteristic diagram of the conventional compensation circuit.

The gain and phase characteristics of phase compensator 50, which is a conventional circuit element, are shown in FIG. 3. As shown in FIG. 3, if the laser beam intensity varies during system operation, or the amount of reflected beam input to the photodiode changes due to fluctuations in the efficiency of the optical system or the reflective ratio shape of the disk being recorded or reproduced changes, the gain of the transmission characteristic of the overall loop changes, as illustrated by the graph of FIG. 3. In FIG. 3, curve 1 shows the case which the gain is increased, curve 2 shows the case which the gain is initially adjusted, and curve 3 shows the case which the gain is decreased.

Also, an error value $\epsilon$ between the plane on which the beam is focused and the disk surface is expressed as follows:

$$\epsilon = \frac{R(t)}{Gt}$$

where R(t) is a plane vibration and Gt is an overall gain.

Therefore, if the overall gain Gt decreases as shown by curve 3 or if the plane vibration Rt exceeds a predetermined window, the error also will increase. Therefore, the error may be greater than the focusing depth. On the contrary, if the overall gain increases as shown by curve 1, the phase decreases so that the system stays in an unstable condition, which leads to oscillation.

Figure 4:
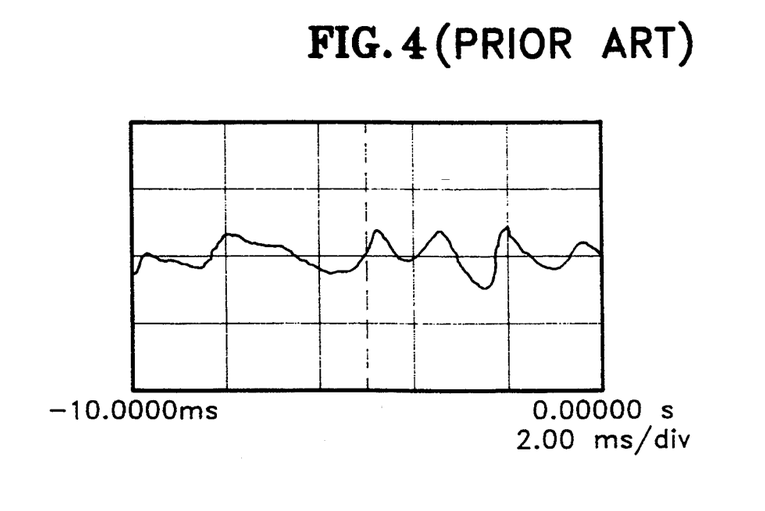
FIG. 4 shows the focusing error signal in the case of a decrease in system gain in the conventional compensation circuit.
Figures 5, 6:
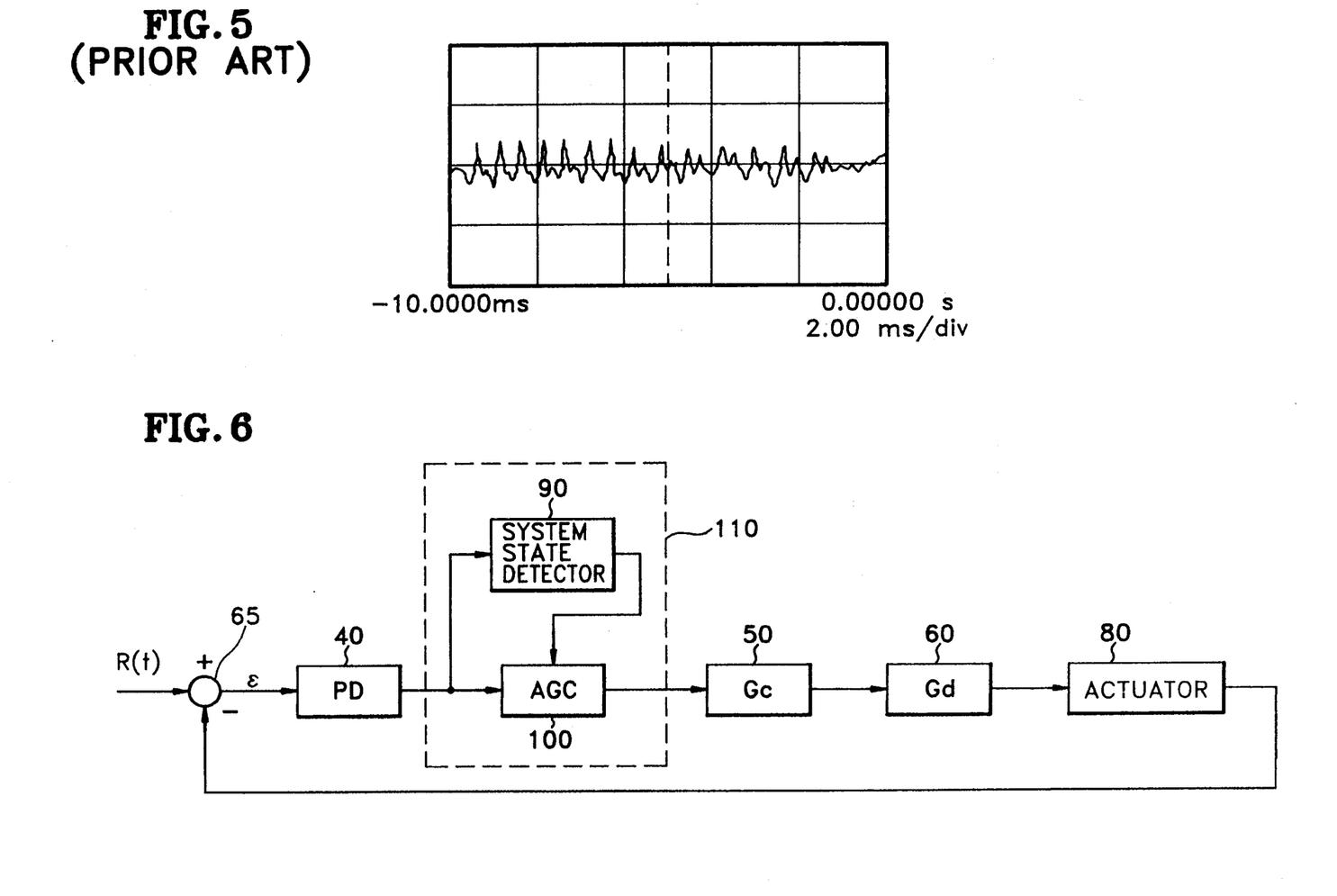
FIG. 5 shows the focusing error signal in the case of an increase in system gain in the conventional compensating circuit.
FIG. 6 is a block diagram showing the focusing control apparatus according to the present invention.

For example, focusing error signals for system gain increase and system gain decrease are shown in FIGS. 4 and 5, respectively. When the system gain decreases, the width of low frequency error signal becomes large, as shown in FIG. 4. In contrast, when the system gain increases, the error signal begins to fluctuate as shown in FIG. 5, with a higher oscillating frequency.

As described above, the conventional phase compensator circuit is furnished with a fixed voltage gain, so that, if laser beam intensity changes during operation of the system or the system uses disks having different reflectances, the overall gain characteristic of the system changes. Therefore, a decrease in gain results in error levels exceeding the focusing depth, to produce an out-of-focus condition. On the other hand, an increase in gain reduces the phase, so that the system oscillates.

SUMMARY OF THE INVENTION

Accordingly, it is an object of the present invention to provide a focusing control circuit further having a circuit for observing the focusing error signal generated from the photodiode and wherein, if the gain of the system decreases, the gain is increased and, if the gain of the system increases, the gain of the circuit is decreased so as to stabilize the system characteristic.

To accomplish the above object, the present invention provides a focusing control apparatus for an optical disk system, the apparatus comprising:

focus error detecting means for detecting a focusing error signal from the focusing information of a light beam irradiated onto and reflected by a disk;

system state gain control means for detecting the state of the system from the focusing error signal detected by the focusing error detecting means, so as to automatically control system gain according to the change of the system gain;

a phase compensator circuit for compensating phase of the focusing error signal according to the focusing error signal whose gain is controlled by the system state gain control means; and an actuator driving circuit for driving an actuator according to the compensated signal.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

The present invention will be described, hereinafter, in more detail with reference to the attached drawings.

FIG. 6 is a block diagram showing the focusing control apparatus according to the present invention.

The control apparatus shown in FIG. 6 is nearly the same as the conventional focusing control apparatus shown in FIG. 2. Here, like components performing the same functions are given the same reference numerals. In FIG. 6, a system state gain controller 110 is further included for detecting the state of the system and thereby automatically controlling the system gain according to the detected state. System state gain controller 110 according to the present invention includes a system state detector 90 for detecting the current state of the system and an automatic gain control (AGC) circuit 100 for automatically increasing/decreasing the gain of the system according to the detected result.

System state detector 90 and AGC circuit 100 constituting system state gain controller 110 of the focusing control apparatus will be described in more detail with reference to FIG. 7.

Figure 7:
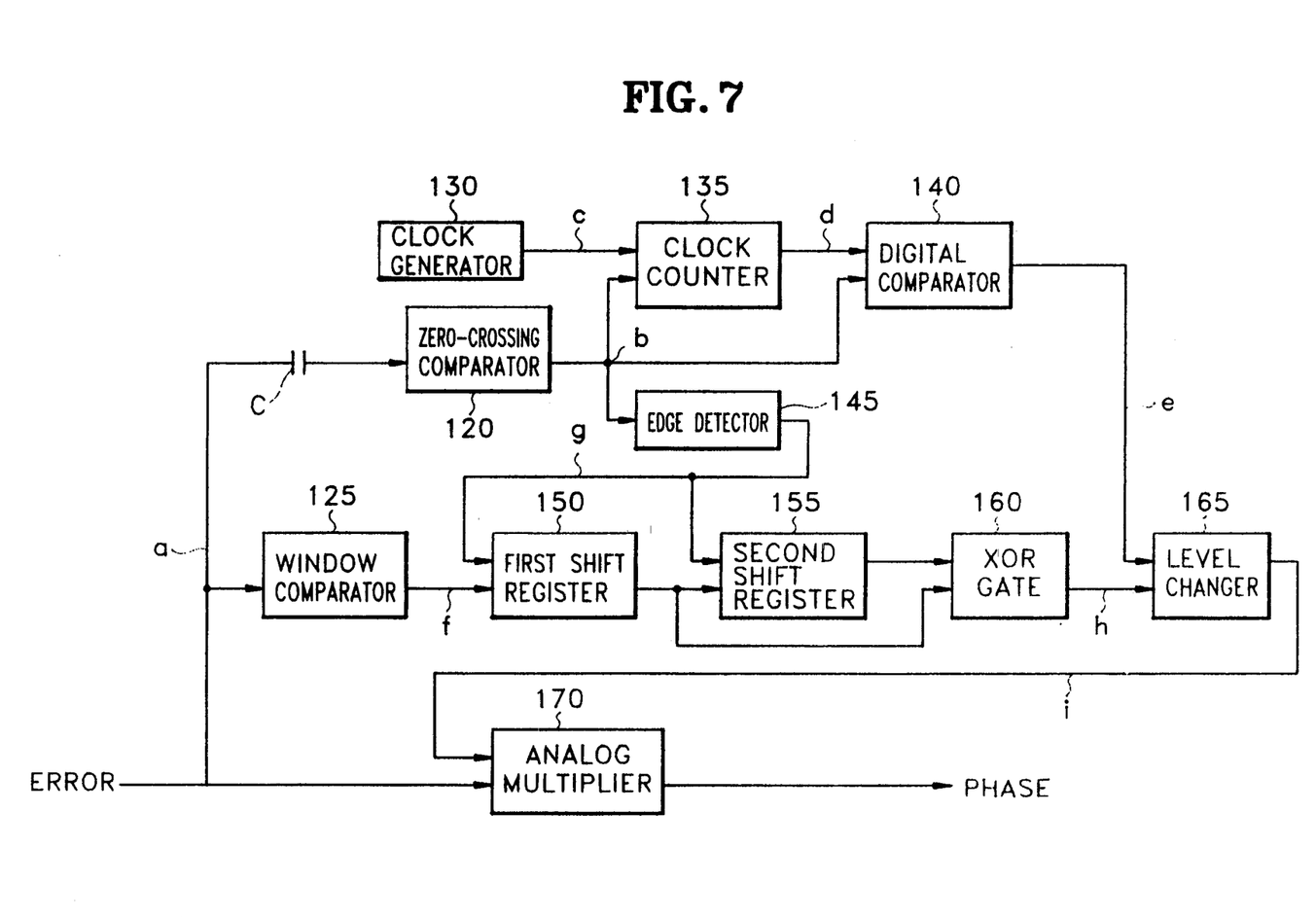
FIG. 7 is a detailed block diagram of the system state detector shown in FIG. 6.

Referring to FIG. 7, reference numeral 120 indicates a zero crossing comparator for comparing the signal after removing the direct current component from the error signal of photodiode PD with a zero level, 125 is a window comparator for comparing the error signal with a predetermined amplitude, 130 is a clock generator for generating a clock signal having a predetermined period, 135 is a clock counter for counting the clock pulses within one period of the zero-crossing output signal, 140 is a digital comparator for comparing the counter output signal with a predetermined signal to thereby determine whether the period of the current error signal is shorter than a predetermined period, 145 is an edge detector for detecting the rising and falling edges of the output signal from the zero-crossing comparator, 150 and 155 are first and second shift registers for delaying the output of the window comparator by using the output of the edge detector as a clock, 160 is an exclusive OR gate, 165 is a level changer for changing the level of the input signal, and 170 is a multiplier for multiplying the error signal by the output of the level changer.

As shown by FIGS. 4 and 5, the error signal is affected by changes in the system gain. That is, low system gain, which corresponds to the lower frequency waveform, increases the amplitude of the error signal. On the contrary, a higher gain leads to oscillation, whereby the error signal oscillates in a relatively high frequency and large amplitude.

In the present invention, system state detector 90 detects the amplitude and period of the error signal, so that, if a lower system gain is detected, the gain of AGC circuit 100 is raised, and vice versa (i.e., when the system gain increases, AGC gain is reduced). Therefore, the system can maintain stable gain characteristics.

Figure 8:
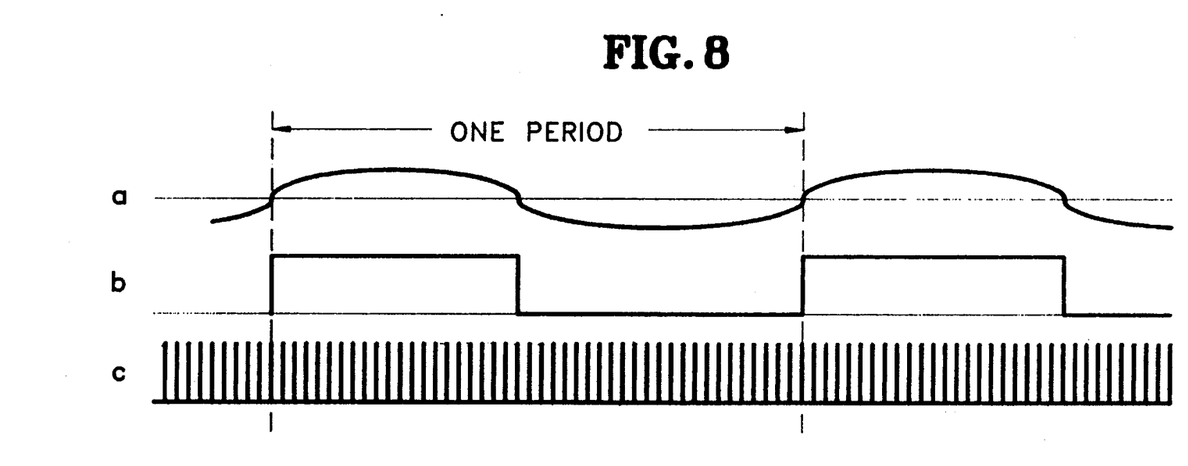
FIG. 8 is a timing diagram of the input data when oscillation does not occur in the apparatus shown in FIG. 6.
Figure 9:
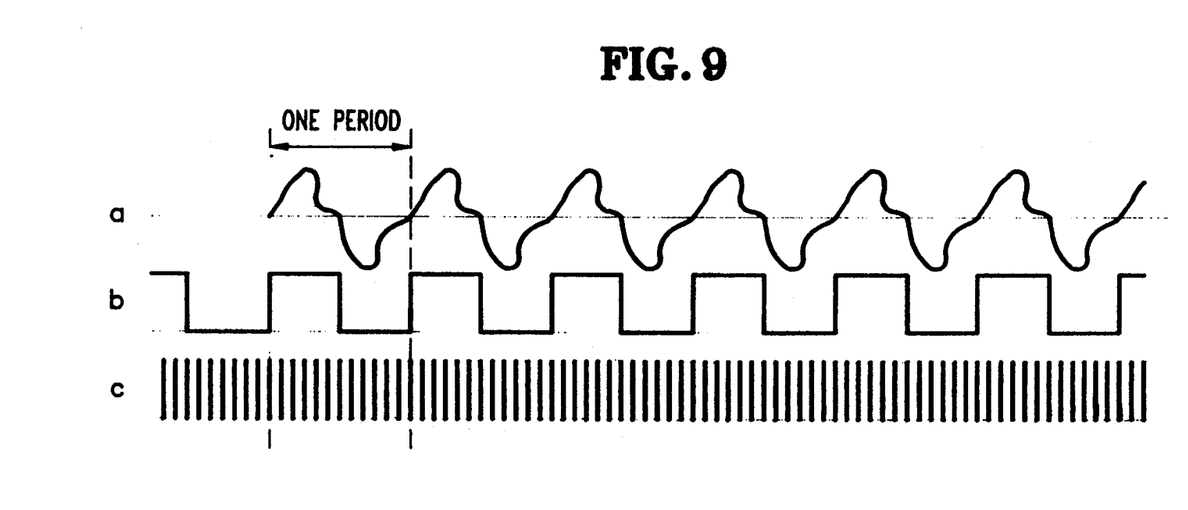
FIG. 9 is a timing diagram of the input data when oscillation occurs in the apparatus shown in FIG. 6.

The operation of the focusing control apparatus according to the present invention having the above-described structure will be described with reference to FIG. 8 showing a timing diagram for system conditions when no oscillation occurs and FIG. 9 showing a timing diagram for system conditions when oscillation does occur.

When an error signal having the "a" waveforms of FIGS. 8 and 9 and detected in the photodiode of a focusing error detector 40 is input to zero-crossing comparator 120, the zero-crossing comparator 120 compares the signal which is removed of the DC component via a capacitor C, with the zero level, to thereby output a rectangular wave signal in the form of the "b" signals of FIGS. 8 and 9.

The produced rectangular wave signal enters the latch and reset ports of clock counter 135 which receives a clock pulse provided by clock generator 130 as the "c" signal of FIGS. 8 and 9 through a data input port and counts the number of pulses input within one period, to thereby produce the counted value.

Digital comparator 140 receives as a clock input the rectangular wave (b) output from zero-crossing comparator 120 and receives as data the input digital signal of clock counter 135. Digital comparator 140 then compares the digital signal with a predetermined digital signal of digital comparator 140. Then, if the output signal of clock counter 135 is smaller than the previously established digital signal, digital comparator 140 determines that the current state is an oscillation and then produces a high logic signal. However, in the opposite case, that is, when the output signal of clock counter 135 is greater than the previously established digital signal, digital comparator 140 determines that the current state is not oscillating and thus produces the low logic signal.

Figure 10:
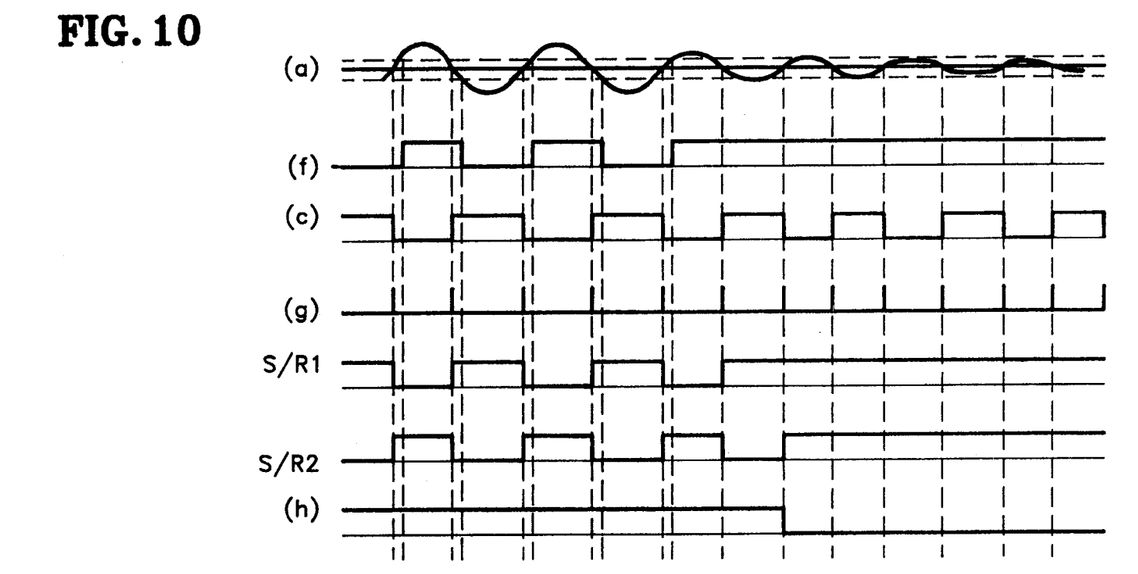
FIG. 10 is a timing diagram for the error amplitude detection in the apparatus shown in FIG. 6.
Figure 11:
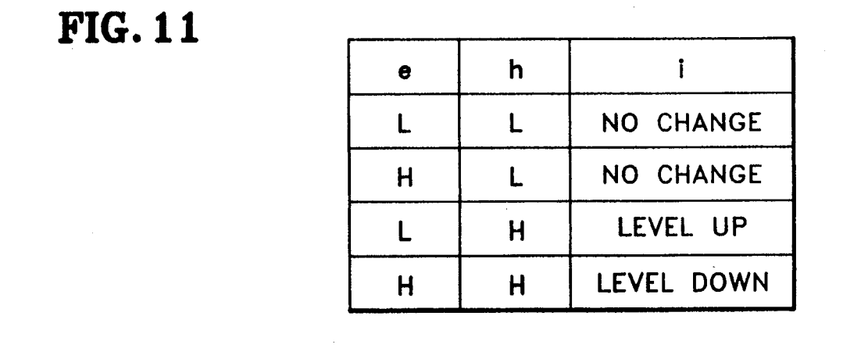
FIG. 11 is a logic table in the level converter shown in FIG. 7.

Also, window comparator 125 receives the error signal (waveform "a" shown in FIG. 10) and determines whether the corresponding error signal has a greater amplitude than a predetermined threshold value. Therefore, if the error signal has a greater amplitude than the predetermined threshold value, window comparator 125 outputs a rectangular wave such as the former part of "f" shown in FIG. 10. When the error signal amplitude drops below the threshold, the signal having a constant logic level ("high" or "low") is output, as in the latter part of FIG. 10.

The output signal of zero-crossing comparator 120 is input to edge detector 145 which then produces a pulse (g) for every transition of the clock signal (c). This pulse signal is input to first and second shift registers 150 and 155 as a latching clock. Meanwhile, the output from window comparator 125 (signal "f") is input to the data port of first shift register 150.

Each of first and second shift registers 150 and 155 is comprised of one D flip-flop and is made of two bits. The two D flip-flops (first and second shift registers 150 and 155) output the input data upon receiving the clock signal at their clock input ports.

As the error signal ("a" of FIG. 10) becomes greater than the threshold value, the window detector output (signal "f") iterates high or low with a time lag with respect to clock signal "g". Therefore, first shift register 150 outputs a one-period-delayed signal of signal "f." That is, the clock is generated by the pulse signal of edge detector 145 just before the signal of window comparator 125 changes, so that the data coming prior to the transition of signal "f" appears at the output of first shift register 150. Accordingly, first shift register 150 effectively delays signal "f" (or signal "g") by one period.

Second shift register 155 receives as latching clock the output signal of edge detector 145 and as data signal the one-period-delayed signal of first shift register, and thus outputs the delayed signal. Also, in this case, the input of second shift register 155 is the output of first shift register 150, the output of second shift register becomes one-period-delayed signal as compared with one from first shift register. As a result, the output of second shift register 155 is delayed one period more than that of first shift register 150, so that the outputs of first and second shift registers have different signs (opposite logic levels) with respect to each other at all times.

On the contrary, if the error signal output is less than the threshold value, the output of window comparator 125 maintains a constant level output (the latter part of FIG. 10), so that the outputs of first and second shift registers 150 and 155 always equal each other.

The outputs of first and second shift registers 150 and 155 are respectively provided to exclusive OR gate 160 which performs an XOR operation. If the logic levels of first and second shift registers 150 and 155 are different from each other, a "high" signal is output, with a "low" being output otherwise (signal "h" of FIG. 10). The output signals of exclusive OR gate 160 and digital comparator 140 are input to level changer 165, thereby changing the level of its output signal.

In more detail, when the output of exclusive OR gate 160 is "low" meaning that the amplitude of the current error signal is within the focusing depth, level changer 165 maintains a constant output signal level. On the contrary, when the output of exclusive OR gate 160 is "high" meaning that the current state requires the system gain to be controlled, level changer 165 changes its output signal level according to the output signal of digital comparator 140. In other words, where the signal from digital comparator 140 is "low," the system gain decreases and so, the normal state error increases, and thereby level changer 165 increases its output signal level. Also, where the output signal from digital comparator 140 is "high," the system gain increases to produce an oscillation state, so that the level changer 165 reduces its output signal level.

The level-adjusted output signal of level changer 165 is input to analog multiplier 170 which works as AGC portion 100, together with the error signal. That is, analog multiplier 170 multiplies the error signal which is an input signal by the output signal of level changer 165, to thereby automatically control the gain of the signal which then enters a phase compensator circuit. As such, the system gain can be changed according to the amplitude change of the output signal processed by analog multiplier 170. That is, an increase of the output signal raises the open-loop gain of the system, but a decrease of the output signal reduces system gain.

As described above, since the gain is controlled according to the change in system gain, the focusing operation can be performed most stably regardless of laser beam intensity fluctuations. Also, even when another disk having a different reflectivity and pit shape is reproduced/recorded, the focusing operation can be performed without any special control of the gain. Furthermore, a stable focusing operation can be achieved even when a badly warped disk is reproduced or recorded, or when the plane vibration of the disk becomes severe.

What is claimed is:

1. A focusing control apparatus for use in an optical disk system including a disk, the focusing control apparatus comprising:

focusing error detecting means for detecting a focusing error signal from focusing information received from a light-beam which is irradiated on and reflected by the disk;

system state gain control means for detecting a state of the optical disk system from the focusing error signal detected by the focusing error detecting means and for automatically controlling a gain of the optical disk system according to a change in the gain of the optical disk system to produce a gain adjusted error signal;

a phase compensator circuit for correcting the phase of the gain adjusted error signal to produce a phase compensated error signal; and an actuator driving circuit for driving an actuator according to the phase compensated error signal.

2. The focusing control apparatus as claimed in claim 1 wherein the system state gain control means comprises:

system state detector means for detecting when the optical disk system has entered a oscillation state, and for detecting whether the amplitude of the focusing error signal is within the focusing depth; and automatic gain control means, responsive to the system state detector means, for automatically adjusting the gain of the optical disk system according to the oscillation state of the optical disk system detected by the state detector means.

3. The focusing control apparatus as claimed in claim 2 wherein the system state detector means comprises:

state determining means for determining when the optical disk system has entered the oscillation state by converting the focusing error signal into a rectangular waveform having a first period, determining the duration of the first period, and comparing the duration of the first period with a predetermined reference value for determining whether the system has entered an oscillation state;

gain control determining means for comparing an amplitude of the focusing error signal with a predetermined threshold value for determining whether the system gain should be controlled;

level changing means for adjusting the gain of an output signal according to a logic combination of an output signal from the state determining means and an output signal from the gain control determining means.

4. The focusing control apparatus as claimed in claim 2 wherein the automatic gain control means includes an analog multiplier.

5. The focusing control apparatus as claimed in claim 3 wherein the state determining means comprises:

means for removing a direct-current component from the focusing error signal;

a zero-crossing comparator for comparing the focusing error signal after the direct-current-component is removed with a zero level and for outputting the rectangular waveform responsive to zero-crossings detected;

a clock generator for generating clock pulses having a predetermined period;

a clock counter, coupled to the clock generator at a clock input for receiving the clock pulses as a data signal and coupled to the zero crossing comparator at a latch and reset input for receiving the rectangular signal and for counting a number of clock pulses input within one period of the rectangular signal;

a digital comparator for comparing the number of clock pulses counted with a predetermined reference value and outputting an output the logic signal responsive to the comparison and indicative of the optical disk system being in the oscillation state.

6. The focusing control apparatus as claimed in claim 5 wherein the gain control determination means comprises:

a window comparator comparing the amplitude of the focusing error signal with a predetermined threshold value and outputting a comparison signal responsive to the comparison, the comparison signal having a rectangular wave if the amplitude of the input error is greater than the predetermined threshold value, and the comparison signal having a constant amplitude if the amplitude of the input error is smaller than the predetermined threshold value;

an edge detector for detecting an edge of the rectangular waveform from the zero crossing comparator and outputting a pulse signal responsive to the edge detected;

a first shift register coupled to the window comparator and the edge detector, receiving the pulse signal of the edge detector at a latching clock input, receiving the comparison signal of the window comparator at a data signal input, for delaying the comparison signal for a first predetermined time;

a second shift register coupled to the first shift register and the edge detector, receiving the pulse signal of the edge detector at a latching clock input and receiving the output signal of the first shift register at a data signal input, for delaying the comparison signal for a second predetermined time; and exclusive OR means for performing an XOR operation on the output of the first and second shift registers for outputting a logic signal for controlling the gain.

7. A focusing control apparatus comprising:

an optical pick-up receiving a reflected light-beam and outputting a signal responsive to the reflected beam, the optical pick-up being adjustable for minimizing focusing error;

a focusing error detector coupled to the optical pick-up, receiving the signal, determining a focusing error from the signal, and outputting a focusing error signal having a period and amplitude, the focusing error signal being responsive to the focusing error;

a system state gain controller coupled to the focusing error detector, inputting the focusing error signal, and adjusting the amplitude of the focusing error signal responsive to the period of the focusing error signal and outputting an amplitude adjusted error signal; and an actuator coupled to the optical pick-up and to the system state gain controller, adjusting the optical pick-up to minimize the focusing error responsive the amplitude adjusted error signal.

8. The focusing control apparatus as claimed in claim 7 wherein the system state gain controller reduces the amplitude of the amplitude adjusted error signal when the period and amplitude of the focusing error signal indicate that an oscillatory state exists.

9. The focusing control apparatus as claimed in claim 8 wherein the oscillatory state is determined to exist when the period of the focusing error signal is less than a predetermined period and the amplitude of the focusing error signal is greater than a predetermined threshold value.

10. The focusing control apparatus as claimed in claim 7 wherein the amplitude of the focusing error signal is adjusted by an analog multiplier.

* * * * *